United States Patent
Gobbi

Patent Number: 5,125,694
Date of Patent: Jun. 30, 1992

[54] QUICK-CONNECT AND DISCONNECT PIPE-JOINT FITTING

[76] Inventor: Gianfranco Gobbi, Via Quercettino No. 12, 60020-Agugliano (AN), Italy

[21] Appl. No.: 684,198

[22] Filed: Apr. 12, 1991

[30] Foreign Application Priority Data

Apr. 13, 1990 [IT] Italy .................. 534/90[U]

[51] Int. Cl.⁵ .................................. F16L 37/092
[52] U.S. Cl. ............................ 285/307; 285/308; 285/322
[58] Field of Search ............. 285/308, 323, 307, 32 L

[56] References Cited

U.S. PATENT DOCUMENTS

| | | | |
|---|---|---|---|
| 4,005,883 | 2/1977 | Guest | 285/322 |
| 4,304,426 | 12/1981 | Francis | 285/323 |
| 4,958,858 | 9/1990 | Guest | 285/322 X |

FOREIGN PATENT DOCUMENTS 2000239  1/1979  United Kingdom .............. 285/322

*Primary Examiner*—Dave W. Arola
*Attorney, Agent, or Firm*—Leonard Bloom

[57] ABSTRACT

An improved quick connect and disconnect pipe joint fitting has a cylindrical body with a truncated cone-shaped internal wall. A sleeve having a plurality of spaced-apart tabs on the end thereof is received in the sleeve. The tabs each have a straight inner surface and a cone-shaped outer surface, the outer surface cooperating with the cone-shaped inner wall of the hollow cylinder. When a pipe is inserted in the sleeve received in the hollow cylinder, the tabs are moved outwardly. When the sleeve is moved outwardly from the hollow cylinder the smooth inner surfaces of the tabs are wedged against the pipe, thereby locking the pipe in the pipe joint fitting.

4 Claims, 1 Drawing Sheet

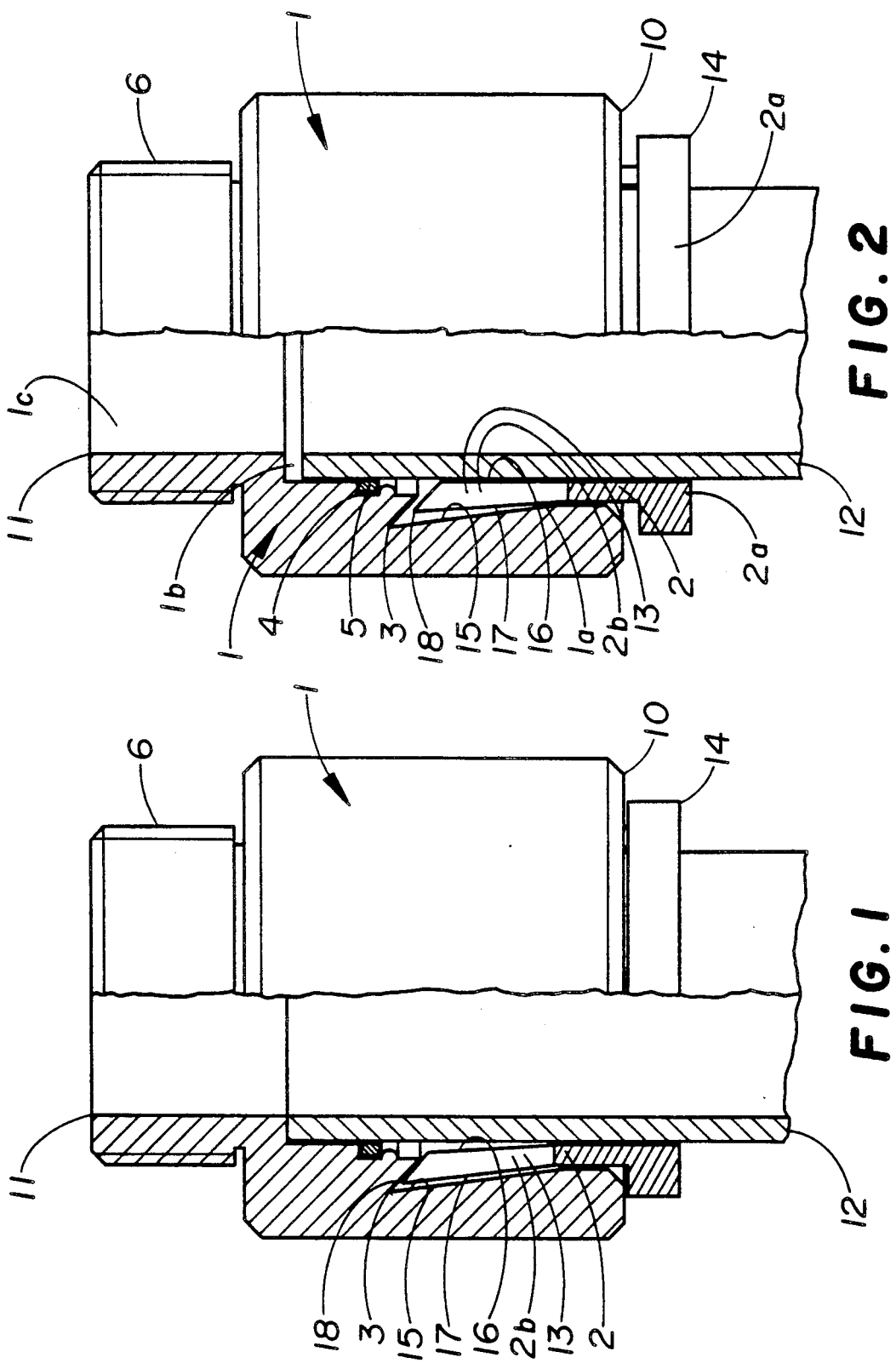

QUICK-CONNECT AND DISCONNECT PIPE-JOINT FITTING

FIELD OF THE INVENTION

The object of the present industrial patent application is an improved quick-connect and disconnect pipe-joint fitting.

BACKGROUND OF THE INVENTION

Italian Patent No. 208921 discloses a quick-connect and disconnect fitting for water system piping. One advantage, among many, of this fitting is that it can be quickly and easily unscrewed from the pipe to which it is attached, unlike all previous models which were difficult to disconnect to the extent that, in similar circumstances, the pipe was cut close to the joint, and if the joint was to be re-used, the end of the pipe that remained in the joint had to be removed, an elaborate and troublesome task.

The invention that is disclosed in Italian Patent No. 208921 consists of a joint with a hollow cylindrical body. The hole in the body where the pipe is inserted is of a larger bore than the external diameter of the pipe, so that it can house a sleeve with an internal diameter that exactly matches that of the exterior of the tube. There is a ring of flexible tabs at the end of the sleeve, that are created by deep diametric cuts at regular intervals in the front end of the sleeve. The interior of the cylindrical cavity that houses the aforementioned sleeve and in which it can move has a number of tightening ribs and its front end is a ring like truncated cone-shaped shoulder. This shoulder connects the aforementioned cavity to an intermediate section of the tube with a smaller diameter, which in turn ends in a ring-shaped step, beyond which there is the tube whose diameter is precisely the same as the internal diameter of the pipe, and which projects from the other end of the body of the joint; the opposite end to that in which the pipe is inserted.

It should be pointed out that truncated cone-shaped shoulder at the end of the section of tube in which the aforementioned sleeve is housed and can move, has its narrow end facing the sleeve, and thus towards the entrance to the joint. Therefore, when the sleeve is pushed forward as far as it will go, all the flexible tabs are stretched apart by the truncated cone-shaped surface against which the aforementioned tabs are pressed.

When the sleeve is extracted from its housing, the aforementioned tightening ribs in the housing exert an action which is completely the opposite of that of the truncated cone-shaped shoulder, and exert a centripetal pressure on the external backs of the tabs, causing the tabs to bend towards the interior, and the tabs tend to lock together towards the center thus permitting the complete extraction of the sleeve when there is no pipe present which would otherwise obstruct the tabs from bending sufficiently towards the center to permit the sleeve to be removed from the joint.

On the contrary, in the last of the two above cases, the teeth can the internal side of the flexible tabs bite into the external surface of the pipe with ever increasing force, thus preventing the pipe from being removed while the system is operating, even when subject to a great deal of tractive force.

The pipe is, however, easy and quick to disconnect, when the sleeve is held in one hand in a fully forward position, and the pipe is pulled back by the other. In this case, the pipe is no longer externally locked in place by the teeth on the tabs, which are now held in an open position by the truncated cone-shaped surface against which they are pressed while the sleeve is held pressed in a fully forward position.

During the use of the aforementioned quick connect and disconnect joint, it has however been found that the biting action of the teeth on the internal side of the aforementioned flexible tabs is not always sufficient to completely ensure that the pipe does not come out of the joint, especially when the aforementioned sleeve is moulded in plastic and the pipe is also made of plastic.

In these circumstances, it has been found that the teeth tend to slide on the pipe, which can thus, when force is applied, progressively work its way free from the joint.

SUMMARY OF THE INVENTION

In order to overcome this problem and to increase the efficiency and reliability of the locking action of the flexible tabs on the section of pipe inserted in the joint, an improved version of this joint according to the present invention has been introduced. This improved version has specially shaped tabs that, instead of having gripping teeth as the old version does, have internal edges that are angled towards the center thus virtually forming a section of cone whose axis is the same as the lengthwise axis of the joint.

In other words, in this new model, the tube is no longer held in several places distributed along the same circumference, but by a plurality of lengthwise sections lying on a single truncated cone-shaped surface.

To be more precise, in this new improved joint each flexible tab has a straight external edge that diverges towards the exterior, and a straight internal edge that diverges towards the interior. Thus, the width of these tabs gradually increases in moving toward the tip of the tab form the point at which the tab is attached to the sleeve.

The internal wall of the cavity housing the tabs and in which they can move axially is shaped like a truncated cone, with the narrow end towards the entrance to the joint, so that when the sleeve is extracted all the tabs are progressively and simultaneously bent towards the center, consequently gradually locking into place a section of pipe that is as long as the internal edges of the tabs. For greater clarity, the description of the invention that follows makes reference to the attached sheet of drawings, which is solely to illustrate and is not limiting.

BRIEF DESCRIPTION OF THE DRAWINGS

FIG. 1 is a side elevational view in partial cross-section of the improved joint according to the invention, in which the sleeve is shown in a fully forward position with the tabs fully stretched apart.

FIG. 2 is a side elevational view in partial cross-section of the improved joint according to the invention, in which the sleeve is shown in a slightly pulled back position with the tabs locked around the pipe.

DESCRIPTION OF THE PREFERRED EMBODIMENT

With reference to the aforementioned Figures, the improved joint includes a hollow cylindrical body (1) with an open first end (10) and a second end (11). The cylindrical body (1) is formed of three sections having differing inner diameters which can be viewed as three co-axial tubes (1a, 1b and 1c) of a decreasing diameter starting from the first end (10), which is the end into which the pipe (12) is inserted. The first tube (1a) forms the housing of a hollow sleeve (2). The sleeve (2) has a first end (13) and a second end (14). The first end (13) is received in the cylindrical body (1) and the second end (14) has an external flange (2a) that strikes against the first end (10) of the body (2) when the hollow sleeve (2) is received in the open end (10) of the cylindrical body (1).

The first tube (1a) has an internal truncated cone-shaped (frusto-conical) wall (15) whose narrow end is near to the first end (10) of the cylindrical body (1). The diameter of the transverse section of the cone-shaped wall (15) increases in moving from the open first end (10) towards the second end (11) of the cylindrical body (1). Alternately, the cone-shaped wall (15) may be viewed as a portion of the internal wall which is inclined increasingly from near the first end (10) of the cylindrical body (1) toward the second end (11) of the cylindrical body (1). The end of the inclined portion nearer the second end (11) of the cylindrical body (1) has a truncated cone-shaped shoulder (3) formed thereto. The shoulder is more conical than the tube (1) and functions as a connection to the intermediate tubular section (1b) of the cylindrical body (1).

The aforementioned hollow sleeve (2) which is received in the cylindrical body (1) has a ring-shaped series of a plurality of spaced-apart flexible tabs (2b) formed by deep diametric cuts at regular intervals about the first end (13) of the sleeve (2). The tabs (2b) are wedge-shaped, each having an inner surface (16) which is internally angled towards the center and an outer surface (17) which is externally angled towards the exterior of the first tube (1a) of the cylindrical body (1). Thus, the wedge is narrower toward the second end (14) and broader toward the first end (13) of the sleeve (2). The outer surface of each tab (2b) forms a truncated cone (frusto-conical shape) which cooperates with the truncated cone (frusto-conical wall) (15) formed in the first tube (1a). The inner surface (16) of each tab (2b) is smooth, without teeth, serrations, notches, protrusions or ribs thereon.

In this manner the cylindrical entrance to the sleeve (2) is of a diameter equal to that of the pipe (12) which is inserted through the sleeve (2) into the cylindrical body (1). Before insertion of the pipe (12) into the sleeve (2), the internal surface (16) of the sleeve (2) forms the wide end of a truncated cone-shaped tube with an ever decreasing diameter that is defined and formed by the internal sides of the aforementioned flexible tabs (2b). Since the outer surfaces (17) of the tabs (2b) are substantially in the same plane as the diameter of the sleeve (2), when a pipe (12) is introduced into the sleeve (2) which is received in the cylinder (1), these tabs stretch apart elastically until their external surfaces (17) contact the truncated cone-shaped internal surface (15) of tube 1a and the inner surfaces (16) of the tabs (2a) are in the same plane as the wall of the pipe (12). When the sleeve (2) in which the pipe (12) has been inserted is moved into the cylindrical body (1), a pointed extremity at the tip (18) of each flexible tab (2b) strikes against the projecting truncated cone-shaped shoulder (3). Contact between the tip (18) of each tab (2b) and the shoulder (3), stretches the tabs (2b) apart and moves the tips (18) of each tab (2b) outwardly from the pipe (12) toward the conical wall (15) in the first tube (12) each time the sleeve (2) is pushed forward into the cylindrical body (1). Movement of the sleeve (2) into the cylindrical body (1) is limited by the external flange (2a) which contacts the outer edge of the first end (10) of the cylindrical body (1). In order to secure the pipe (12) in the cylindrical body (1), the sleeve (2), with the pipe (12) inserted therein, is moved outwardly from the cylindrical body (1). The outer surfaces (17) of the tabs (2b) about the ring shape contact the cone-shaped wall (15) of the first tube (1a) and wedge the straight inner surface (16) of each tab (2b) against the pipe (12). The further the sleeve (2) is extracted from the cylindrical body (1), the more securely the pipe (12) is locked in the fitting. To release the pipe (12), the sleeve is moved forwardly in the cylindrical body (1).

There is a groove (4) in the intermediate (second) tubular section (1b) that houses a sealing ring (5), and there is a screw thread (6) on the second end of the third tubular section (1c) of the cylindrical body (1) to permit a cap to be threadingly attached to the second end (11) of the cylindrical body (1).

I claim:

1. A quick-connect and disconnect fitting for a pipe having an outer wall, the fitting comprising a hollow cylindrical body, the body having a first end, a second end and an inner wall, a first cylindrical portion of the inner wall being of uniform diameter, a second portion of the inner wall being frusto-conical and intersecting the first cylindrical portion of the cylindrical body, the second portion of the inner wall being inclined toward the second end of the cylindrical body, a sleeve means into which the pipe is inserted, the sleeve means having a cylindrical portion of uniform outer diameter and being snugly received in the first end of the cylindrical body, the sleeve means having a plurality of spaced-apart flexible wedge-shaped tabs extending from said cylindrical portion in a ring shape, each tab having a smooth inner surface and a smooth frusto-conical outer surface, the tabs extending into the cylindrical body, wherein the outer wall of the pipe contacts the inner surface of each tab, about the ring, moving the tabs axially outwardly, the outer frusto-conical surface of each tab about the ring cooperating with the inclined portion of the inner wall of the cylindrical body, means for locking the pipe in the fitting comprising the sliding of the sleeve outwardly from the hollow body wherein the smooth frusto-conical outer surfaces of the respective tabs are in contact with the inclined portion of the inner wall of the cylindrical body and the smooth inner surfaces of the respective tabs are wedged against the outer wall of the pipe, and a sealing means between the cylindrical body and the pipe.

2. The fitting of claim 1, wherein the inclined portion of the inner wall of the cylindrical body terminates toward the second end of the cylindrical body at a shoulder, each tab having a tapered tip thereon, the tapered tip of the respective tabs contacting the shoulder when the sleeve is moved into the cylindrical body wherein the outer surface of the tabs are directed toward the inner wall of the cylindrical body.

3. The pipe-joint fitting of claim 1, further comprising the sleeve having a second end extending outwardly from the cylindrical body, the second end having an external flange formed thereon, the flange limiting the movement of the sleeve into the cylindrical body.

4. A quick-connect and disconnect pipe-joint fitting comprising a hollow cylindrical body, the cylindrical body having a first open end and a second end, the cylindrical body further having an internal wall, the inner wall having a first portion of uniform diameter and a second portion of the internal wall being frusto-conical, intersecting the first portion of the inner wall and extending from said first portion and terminating at a shoulder within the cylindrical body, a hollow sleeve having a cylindrical portion of uniform diameter and being snugly received in the first open end of the cylindrical body, the sleeve having an end extending into the cylindrical body, the end of the sleeve forming a plurality of spaced-apart flexible tabs in a ring shape, each tab having a tapered tip, a smooth inner surface and a frusto-conical outer surface, the frusto-conical outer surface of each respective tab cooperating with the frusto-conical inner wall of the cylindrical body, wherein when a pipe is slidingly inserted in the sleeve, the pipe contacts the inner surface of each tab, moving the tabs axially outwardly toward the inner wall of the cylindrical body and the sleeve further into the cylindrical body whereby the tapered tip of each tab about the ring contacts the shoulder on the internal wall of the cylindrical body moving the tip of said tab outwardly toward the inner wall of the cylindrical body and wherein, when the sleeve is slid outwardly from the cylindrical body, the outer frusto-conical surface of each tab about the ring contacts the frusto-conical inner wall of the cylindrical body wedging the smooth inner surface of each tab against the pipe, so that the pipe is secured within the cylindrical body and further comprising a sealing means between the cylindrical body and the pipe.

* * * * *